No. 805,844. PATENTED NOV. 28, 1905.
S. J. DUNKLEY.
AUTOMATIC PROCESSING OR COOKING AND COOLING MACHINE.
APPLICATION FILED MAY 12, 1902.
3 SHEETS—SHEET 1.
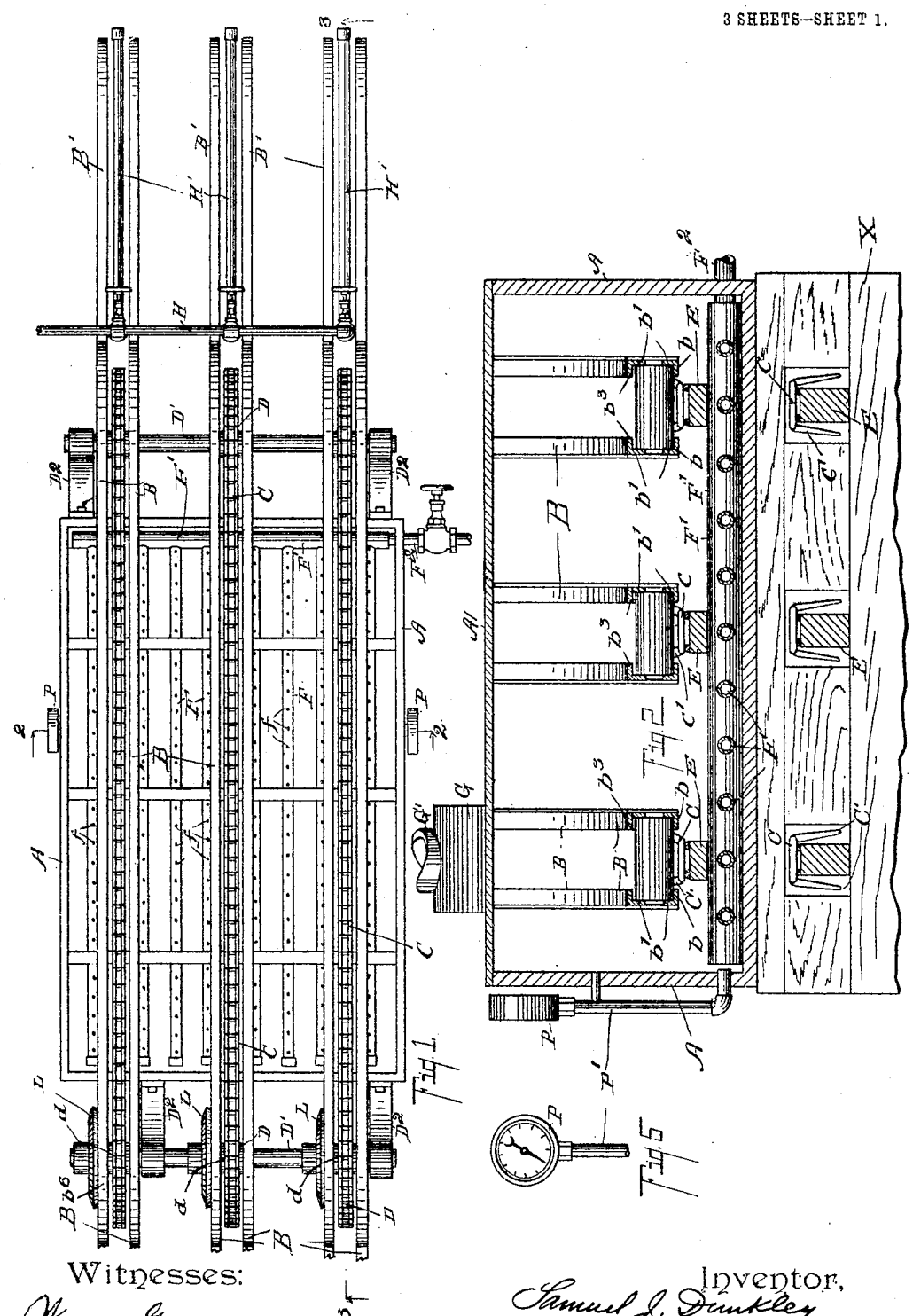

No. 805,844. PATENTED NOV. 28, 1905.
S. J. DUNKLEY.
AUTOMATIC PROCESSING OR COOKING AND COOLING MACHINE.
APPLICATION FILED MAY 12, 1902.
3 SHEETS—SHEET 2.
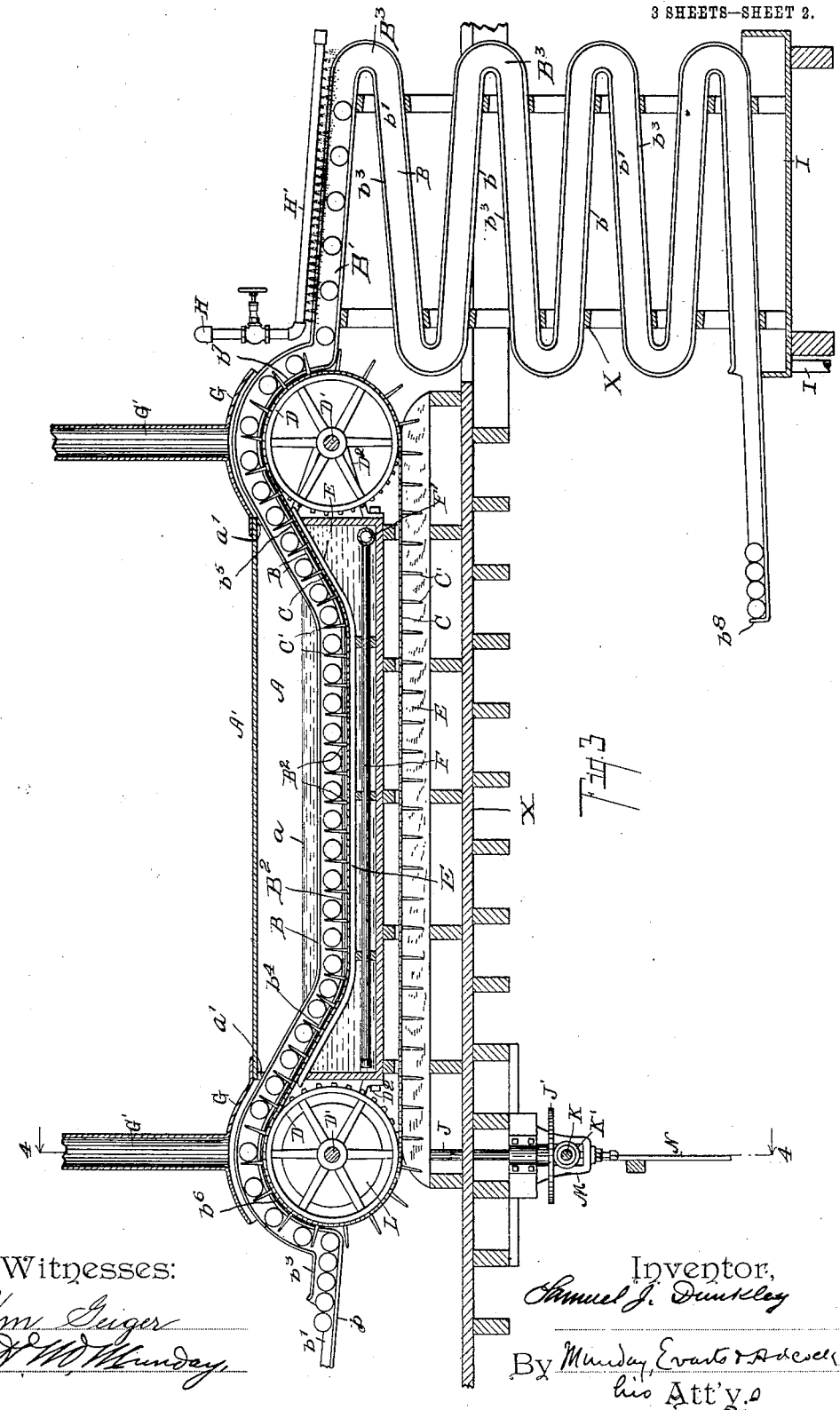
Witnesses:
Wm Geiger
H. W. Munday
Inventor,
Samuel J. Dunkley
By Munday, Evarts & Adcock
his Att'ys

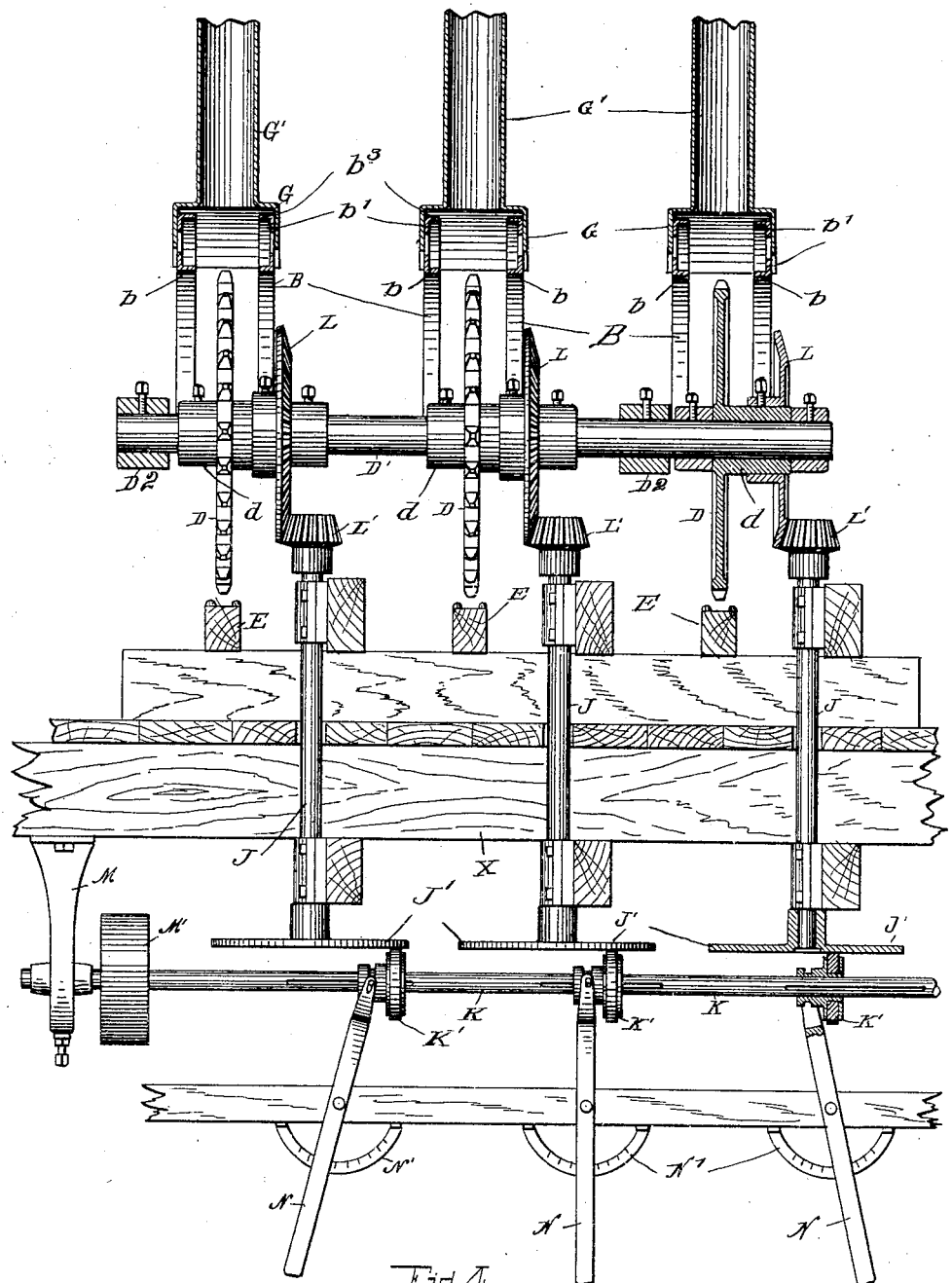

UNITED STATES PATENT OFFICE.

SAMUEL J. DUNKLEY, OF KALAMAZOO, MICHIGAN, ASSIGNOR TO DUNKLEY COMPANY, OF KALAMAZOO, MICHIGAN, A CORPORATION OF MICHIGAN.

AUTOMATIC PROCESSING OR COOKING AND COOLING MACHINE.

No. 805,844.      Specification of Letters Patent.      Patented Nov. 28, 1905.

Application filed May 12, 1902. Serial No. 107,033.

*To all whom it may concern:*

Be it known that I, SAMUEL J. DUNKLEY, a citizen of the United States, residing in Kalamazoo, in the county of Kalamazoo and State of Michigan, have invented a new and useful Improvement in Automatic Processing or Cooking and Cooling Machines, of which the following is a specification.

My invention relates to machines or apparatus for processing or cooking and cooling cans or vessels containing food products.

The object of my invention is to provide an automatic machine or apparatus of a cheap, simple, and durable construction by means of which cans or vessels containing food products and the contents thereof may be processed, cooked, or sterilized, as required, and again cooled without hand-labor or handling of the cans or vessels and by means of which the contents of the cans or vessels may be processed, cooked, or sterilized uniformly and to the precise degree or extent required or necessary for the particular kind or character of fruit, vegetable, or food-product being operated upon and by means of which the same machine or apparatus may be used at the same time for cooking, processing, or sterilizing different kinds of fruits, vegetables, or food products, each to the particular extent necessary, although one kind may require a much greater amount of cooking, processing, or sterilizing than another, and by means of which the minimum degree of cooking, processing, or sterilizing necessary for the proper preservation of each particular kind of food product may be always employed.

My invention consists in the means I employ and have devised for practically accomplishing this object or result—that is to say, it consists in a tank or chamber containing a heating fluid, preferably water, of a series of endless flexible conveyers and tracks extending through the heating fluid in the tank or chamber, a series of chutes or runways for delivering the cans or vessels continuously to the continuously-moving conveyers, means for independently adjusting the speed of the several conveyers, means for heating the fluid in the tank or chamber, and a series of runways for automatically receiving or discharging the cans from the tank or chamber and cooling the cans or vessels.

My invention also consists in the novel construction of parts and devices and in the novel combinations of parts and devices herein shown or described.

In the accompanying drawings, forming a part of this specification, Figure 1 is a plan view of a machine or apparatus embodying my invention. Fig. 2 is an enlarged vertical cross-section on the line 2 2 of Fig. 1. Fig. 3 is a longitudinal section on the line 3 3 of Fig. 1. Fig. 4 is an enlarged vertical section on the line 4 4 of Fig. 3, and Fig. 5 is a detail view showing the gage for indicating the temperature of the heating fluid.

In the drawings, X represents the frame of the machine.

A is a long tank or chamber containing a heating fluid $a$, preferably water, and it is provided or preferably provided with a close-fitting cover A'.

C C are a series of endless flexible conveyers for conveying the cans or vessels through the heating fluid in the tank or chamber A and immersing the same therein, these conveyers being preferably provided each with a series of fingers C' for pushing the cans along on their runways or tracks. Each of the endless flexible conveyers C travels upon a pair of pulleys or sprocket-wheels D D, mounted to revolve on the non-rotating shaft D'. The pulleys or sprocket-wheels D D are preferably journaled outside the tank or chamber A.

B B are a series of chutes, tracks, or runways for delivering the cans automatically to the conveyers C C, and B' B' are discharge chutes, tracks, or runways for receiving the cans as they are discharged from the conveyer C. Preferably a series of tracks or runways $B^2$ for the cans are also employed for supporting the cans while they are being conveyed through the heating fluid $a$ in the tank or chamber A, so that the cans need not be supported by the conveyers while in the tank and so that the conveyer may thus operate to give the cans a rotary motion as they are conveyed through the heating fluid, as the constant rolling or turning of the cans in the heating fluid causes the contents thereof to be more quickly and uniformly heated throughout or to the center thereof, and thus enables the same to be properly and perfectly processed or sterilized with less exposure to heat than could otherwise be done. The track or runway $B^2$ for the cans or vessels in the tank or chamber A may preferably be simply a continuation of the runway B, by which the cans are delivered to the machine, and the runway B', by which they are discharged.

E E are tracks or guides for the endless flexible conveyers C or the upper loops thereof in the track or chamber, the same being, like the runway $B^2$ for the cans, inclined downward at the entrance and upward at the exit end of the tank or chamber A.

F is a heater for heating the fluid $a$ in the tank or chamber A, the heater consisting, preferably, of a series of steam-pipes provided with perforations $f$ and connected to the steam-pipe F', to which steam is admitted by the steam-supply pipe $F^2$.

The non-rotating shaft or spindle D' is supported on suitable brackets $D^2$ of the frame of the machine, and to the hub $d$ of each of the pulleys or sprocket-wheels D is secured a bevel-gear L, which meshes with a bevel-gear L' on a shaft J, which carries on its lower end a friction wheel or disk J', which receives its motion from the driving-shaft K through an adjustable sliding or friction wheel K', splined on said shaft, so that by moving the friction-wheel K' in or out from the center of the disk J' by means of the adjusting-lever N the speed of the pulley or sprocket D and of the conveyer C may be regulated as required, according to the particular character of fruit, vegetable, or other food product being cooked or processed.

N' is a graduated index for indicating the speed of the conveyer and the time taken to convey a can through the heating fluid $a$.

As each of the conveyers is independently driven from the driving-shaft K through the independently-movable speed-adjusting friction-wheels K', it will readily be understood that each of the several conveyers may be adjusted to immerse the cans or vessels therein in the heating fluid $a$ a greater or less length of time, according to the particular character and requirements of the cans in each.

At each end of the tank A, beneath the cover A', are openings $a'$ for the entrance and exit of the conveyers C and the cans conveyed thereby, and the cover A' is provided with curved extensions G G, extending over the pulleys or sprocket-wheels D D, said extensions G having exhaust-pipes G' for escape of steam from the heated water or fluid $a$.

To cool the cans as they are delivered from the conveyer, the discharge chute or runway B' is provided with convoluted extensions thereof, $B^3$, to give opportunity for the cans to cool by radiation or evaporation. To facilitate the cooling, the cooler $B^3$ is also preferably furnished with a perforated sprinkler H', supplied with cold water from the pipe H, so that cold water may be applied to the cans as they move through the convoluted cooler-runway. A drip-tank I, having a discharge-pipe I', collects the water sprinkled upon the cans.

Each of the runways $B^2$ preferably has a pair of rails $b\ b$, upon which the cans rest or roll, and a pair of side guides $b'$ to keep the cans or vessels in position endwise, and the can-delivery chutes or runways B and the can-discharge chutes or runways B' are also preferably of the same construction. The can track or runway $B^2$ is also preferably provided with a pair of upper flanges or guides $b^3$ to keep the cans in position and prevent their floating out of the conveyer or runway in case they should be lighter than the heating fluid $a$ in the tank A. To immerse the cans in the heating fluid, the can track or runway $B^2$ has a downward incline $b^4$ at the entrance end and is also provided with an upward incline $b^5$ at the exit end of the tank. The runway B has a curved extension $b^6$ extending over the pulley D at the entrance end of the tank, and the discharge-runway B' has a curved extension $b^7$, extending over the pulley D at the exit end of the tank. The convoluted cooler-runway $B^3$ is preferably of the same construction as the runway $B^2$—that is to say, composed of upper and lower tracks or flanges $b$ and $b^3$ and side guides $b'$.

The shaft K is journaled upon a suitable bracket M, secured to the frame and is provided with a driving-pulley M'.

P is a gage for regulating or indicating the degree of heat supplied to the heater. It is connected to the tank A by a pipe P'.

The can-cooling runway $B^3$ has a stop $b^8$ on its extreme lower end to check the discharge of the cans, and thus enable the cans in the convoluted runway to be kept longer therein.

In my invention I employ, in combination with the tank containing the heating liquid, a series of independently-movable endless flexible conveyers with means for driving the conveyers at different speeds and adjusting the speeds thereof, as may be required for cooking and sterilizing different food products, so that one and the same cooking apparatus may be used at the same time for canning different fruits, vegetables, and other food products, which are frequently delivered to the canning factory at the same time and require to be cooked and sterilized at the same time in order to prevent deterioration or spoiling and to secure the best results. In my invention also the cans are rolled or given a turning movement as they are conveyed through the heating fluid, and this rolling or turning of the cans also greatly facilitates the proper cooking, heating, and sterilizing of their contents to the center of the cans and insures uniformity of cooking and sterilization throughout the whole contents of the cans without undue cooking of or injury to any portion of the contents of the can, which is a result secured by my invention of very great importance and value in practical canning operations.

I claim—

1. In a machine or apparatus for cooking, processing or sterilizing filled cans or vessels and cooling the same, the combination with a tank or chamber containing a heating fluid, of a series of tracks or runways for the cans extending into and out of said tank and having downward inclines at the entrance end thereof and upward inclines at the exit end thereof, and a series of endless flexible conveyers for conveying the cans with a rolling motion on said tracks through the heating fluid in said tank, means for independently driving said conveyers and adjusting the speed thereof, a series of convoluted runways for cooling the cans, and means for applying water to the cans in the cooler-runways, substantially as specified.

2. The combination with a tank or chamber containing a heating fluid, of a heater, a series of tracks or runways for the cans extending into and out of said tank and having downward inclines at the entrance end thereof and upward inclines at the exit ends thereof a series of independently and simultaneously movable endless flexible conveyers extending under and along the runways in the tank for moving the cans in and out of the tank and immersing them in the heating fluid therein, said conveyers and runways coacting to roll the cans as they are conveyed substantially as specified.

3. The combination with a tank or chamber containing a heating fluid, of a heater, a series of tracks or runways for the cans extending into and out of said tank and having downward inclines at the entrance end thereof and upward inclines at the exit ends thereof a series of independently-movable endless flexible conveyers extending under and along the runways in the tank for moving the cans or vessels in, through and out of the tank and immersing them in the heating fluid therein, and means for simultaneously driving the several conveyers at different speeds as may be required for cooking, processing or sterilizing different food products, said conveyers and runways coacting to roll the cans as they are conveyed substantially as specified.

4. The combination with a tank or chamber containing a heating fluid, of a heater, a series of tracks or runways for the cans extending into and out of said tank and having downward inclines at the entrance end thereof and upward inclines at the exit ends thereof a series of independently-movable endless flexible conveyers extending under and along the runways in the tank for moving the cans or vessels in, through and out of the tank and immersing them in the heating fluid therein, means for simultaneously driving the several conveyers at different speeds as may be required for cooking, processing or sterilizing different food products, and means for automatically delivering the cans or vessels to said conveyers, said conveyers and runways coacting to roll the cans as they are conveyed substantially as specified.

5. The combination with a tank or chamber containing a heating fluid, of a heater, a series of tracks or runways for the cans extending into and out of said tank and having downward inclines at the entrance end thereof and upward inclines at the exit ends thereof a series of independently-movable endless flexible conveyers extending under and along the runways in the tank for moving the cans or vessels in, through and out of the tank and immersing them in the heating fluid therein, means for simultaneously driving the several conveyers at different speeds as may be required for cooking, processing or sterilizing different food products, means for automatically delivering the cans or vessels to said conveyers, and chutes or runways for delivering the cans from the conveyers, said conveyers and runways coacting to roll the cans as they are conveyed substantially as specified.

6. The combination with a tank or chamber containing a heating fluid, of a heater, a series of tracks or runways for the cans extending into and out of said tank and having downward inclines at the entrance end thereof and upward inclines at the exit ends thereof a series of independently and simultaneously movable endless flexible conveyers extending under and along the runways in the tank for moving the cans or vessels in, through and out of the tank and immersing them in the heating fluid therein, and a series of chutes or runways for automatically delivering the cans or vessels to the conveyers, said conveyers and runways coacting to roll the cans as they are conveyed substantially as specified.

7. The combination with a tank or chamber containing a heating fluid, of a heater, a series of tracks or runways for the cans extending into and out of said tank and having downward inclines at the entrance end thereof and upward inclines at the exit ends thereof a series of independently and simultaneously movable endless flexible conveyers extending under and along the runways in the tank for moving the cans or vessels in, through and out of the tank and immersing them in the heating fluid therein, a series of chutes or runways for automatically delivering the cans or vessels to the conveyers, and a series of discharge chutes or runways for receiving the cans or vessels from the conveyers, said conveyers and runways coacting to roll the cans as they are conveyed substantially as specified.

8. The combination with a tank or chamber containing a heating fluid, of a heater, a series of tracks or runways for the cans extending into and out of said tank and having downward inclines at the entrance end thereof and upward inclines at the exit ends thereof a series of independently and simultaneously movable endless flexible conveyers extending under and along the runways in the tank for moving the cans or vessels in, through and out of the tank and immersing them in the heating fluid therein, a series of chutes or runways for automatically delivering the cans or vessels to the conveyers, a series of discharge-chutes or runways for receiving the cans or vessels from the conveyer, and a series of convoluted runways for cooling the cans, said conveyers and runways coacting to roll the cans as they are conveyed substantially as specified.

9. The combination with a tank or chamber containing a heating fluid, of a heater, a series of tracks or runways for the cans extending into and out of said tank and having downward inclines at the entrance end thereof and upward inclines at the exit ends thereof a series of independently and simultaneously movable endless flexible conveyers extending under and along the runways in the tank for moving the cans or vessels in, through and out of the tank and immersing them in the heating fluid therein, a series of chutes or runways for automatically delivering the cans or vessels to the conveyers, a series of discharge-chutes or runways for receiving the cans or vessels from the conveyer, a series of convoluted runways for cooling the cans, and means for applying water to the cans in the cooler-runway, said conveyers and runways coacting to roll the cans as they are conveyed substantially as specified.

10. The combination with a tank or chamber containing a heating fluid, of a heater, a series of tracks or runways for the cans extending into and out of said tank and having downward inclines at the entrance end thereof and upward inclines at the exit ends thereof a series of independently and simultaneously movable endless flexible conveyers extending under and along the runways in the tank for moving the cans or vessels in, through and out of the tank and immersing them in the heating fluid therein, a series of chutes or runways for automatically delivering the cans or vessels to the conveyers, and means for driving the several conveyers at different speeds, said conveyers and runways coacting to roll the cans as they are conveyed substantially as specified.

11. The combination with a tank or chamber containing a heating fluid, of a heater, a series of tracks or runways for the cans extending into and out of said tank and having downward inclines at the entrance end thereof and upward inclines at the exit ends thereof a series of independently and simultaneously movable endless flexible conveyers extending under and along the runways in the tank for moving the cans or vessels in, through and out of the tank and immersing them in the heating fluid therein, a series of chutes or runways for automatically delivering the cans or vessels to the conveyers, and mechanism for driving the conveyers, comprising a series of friction-disks and a series of independently-adjustable friction-wheels to vary the speed of the different conveyers as may be required, said conveyers and runways coacting to roll the cans as they are conveyed substantially as specified.

12. The combination with a tank containing a heating fluid, of a heater, a series of tracks or runways for the cans extending into and out of said tank and having downward inclines at the entrance end thereof and upward inclines at the exit ends thereof an endless flexible conveyer extending under and along the runways in the tank for conveying and rolling the cans in, through and out of the tank and immersing them in the heating fluid, said conveyer and runway coacting to roll the cans as they are conveyed substantially as specified.

13. The combination with a tank containing a heating fluid, of a heater, a series of tracks or runways for the cans extending into and out of said tank and having downward inclines at the entrance end thereof and upward inclines at the exit ends thereof an endless flexible conveyer extending under and along the runways in the tank for conveying and rolling the cans in, through and out of the tank and immersing them in the heating fluid, and means for varying or adjusting the speed of the conveyer to regulate the amount or extent of cooking or processing as may be required according to the particular character of the food products being treated, said conveyer and runway coacting to roll the cans as they are conveyed substantially as specified.

14. The combination with a tank containing a heating fluid, of a heater, a series of tracks or runways for the cans extending into and out of said tank and having downward inclines at the entrance end thereof and upward inclines at the exit ends thereof an endless flexible conveyer extending under and along the runways in the tank for conveying and rolling the cans in, through and out of the tank and immersing them in the heating fluid, and mechanism for driving the conveyer, comprising a friction-disk and a sliding friction-wheel to regulate the speed of the conveyer as required for different food products, substantially as specified.

15. The combination with a tank containing a heating fluid, of a heater, a series of tracks or runways for the cans extending into and out of said tank and having downward inclines at the entrance end thereof and upward inclines at the exit ends thereof an endless flexible conveyer extending under and along the runways in the tank for conveying and rolling the cans in, through and out of the tank and immersing them in the heating fluid, and a chute or runway for automatically delivering the cans or vessels to the conveyer, said conveyer and runway coacting to roll the cans as they are conveyed, substantially as specified.

16. The combination with a tank containing a heating fluid, of a heater track or runway in the tank along which the cans may be rolled, an endless flexible conveyer extending under and along the can-runway in the tank for conveying and rolling the cans in, through and out of the tank and immersing them in the heating fluid, a chute or runway for automatically delivering the cans or vessels to the conveyer, a track or guide for the conveyer, said track or runway for the cans or vessels having a downward incline at the entrance end thereof and an upward incline at the exit end thereof, said conveyer and runway coacting to roll the cans as they are conveyed, substantially as specified.

17. The combination with a tank containing a heating fluid, of a heater track or runway in the tank along which the cans may be rolled, an endless flexible conveyer extending under and along the can-runway in the tank for conveying and rolling the cans in, through and out of the tank and immersing them in the heating fluid, said track or runway in the tank for supporting the cans having a downward incline at the entrance end thereof and an upward incline at the exit end thereof, the conveyer operating to give the cans a rolling or turning movement while immersed in the heating fluid, said conveyer and runway coacting to roll the cans as they are conveyed substantially as specified.

18. The combination with a tank containing a heating fluid, of a heater, an endless flexible conveyer for conveying and rolling the cans in, through and out of the tank and immersing them in the heating fluid, a chute or runway for automatically delivering the cans or vessels to the conveyer, and a track or runway upon which the cans roll as they are conveyed through the tank and heating fluid, said conveyer and runway coacting to roll the cans as they are conveyed and said conveyer extending under and along the runway in the tank, substantially as specified.

19. The combination with a tank containing a heating fluid, of a heater, an endless flexible conveyer, pulleys therefor at each end of the tank, a continuous runway for the cans extending to the conveyer over the conveyer-pulleys and through the tank, and having inclines at each end of the track, said conveyer operating to roll the cans along said runway through the tank and said conveyer extending under and along the runway in the tank, substantially as specified.

20. The combination with a tank containing a heating fluid, of a heater, an endless flexible conveyer for conveying and rolling the cans through the heating fluid, pulleys therefor at each end of the tank, a continuous runway for the cans extending to the conveyer over the conveyer-pulleys and through the tank, and having inclines at each end of the tank, said runway comprising a pair of rails and a pair of side guides for the ends of the cans, said conveyer and runway coacting to roll the cans as they are conveyed and said conveyer extending under and along the runway in the tank, substantially as specified.

21. The combination with a tank containing a heating fluid, of a heater, an endless flexible conveyer for conveying and rolling the cans through the heating fluid, pulleys therefor at each end of the tank, a continuous runway for the cans extending to the conveyer over the conveyer-pulleys and through the tank, and having inclines at each end of the tank, and a convoluted can-cooling runway connecting with said first-mentioned runway, said conveyer and runway coacting to roll the cans as they are conveyed and said conveyer extending under and along the runway in the tank, substantially as specified.

22. The combination with a tank containing a heating fluid, of a heater, an endless flexible conveyer for conveying and rolling the cans through the heating fluid pulleys therefor at each end of the tank, a continuous runway for the cans extending to the conveyer over the conveyer-pulleys and through the tank and having inclines at each end of the tank, and a convoluted can-cooling runway connecting with said first-mentioned runway, said can-cooling runway having a stop for the cans at its lower end to enable the same to be kept full of cans, said conveyer and runway coacting to roll the cans as they are conveyed and said conveyer extending under and along the runway in the tank, substantially as specified.

23. The combination with a tank or chamber containing a heating fluid, of a heater, a series of independently and simultaneously movable endless flexible conveyers for moving the cans in and out of the tank and immersing and rolling them in the heating fluid therein, a series of tracks or runways for the cans extending through the tank and having inclines at the ends thereof, said conveyers and runways coacting to roll the cans as they are conveyed and said conveyers extending under and along the runways in the tank, substantially as specified.

24. The combination with a tank or chamber containing a heating fluid, of a heater, a series of independently and simultaneously movable endless flexible conveyers for moving the cans in and out of the tank and immersing and rolling them in the heating fluid therein, and a series of tracks or runways and having inclines at the ends thereof for the cans along which they roll through the heating fluid, said conveyers and runways coacting to roll the cans as they are conveyed and said conveyers extending under and along the runways in the tank, substantially as specified.

25. The combination with a tank or chamber containing a heating fluid, of a heater, a series of independently and simultaneously movable endless flexible conveyers for moving the cans in and out of the tank and immersing and rolling them in the heating fluid therein, a series of tracks or runways and having inclines at the ends thereof for the cans along which they roll through the heating fluid, and chutes or runways for delivering the cans to the conveyers, said conveyers and runways coacting to roll the cans as they are conveyed and said conveyers extending under and along the runways in the tank, substantially as specified.

26. The combination with a tank containing a heating fluid and a plurality of tracks or runways for the cans extending into and out of the tank and having downward inclines at the entrance end thereof and upward inclines at the exit end thereof, of a plurality of independently and simultaneously movable traveling conveyers for conveying and rolling the cans through the heating fluid in the tank, said conveyers and runways coacting to roll the cans as they are conveyed and said conveyers extending under and along the runways in the tank, substantially as specified.

27. The combination with a tank containing a heating fluid and a plurality of tracks or runways for the cans extending into and out of the tank and having downward inclines at the entrance end thereof and upward inclines at the exit end thereof, of a plurality of independently and simultaneously movable traveling conveyers for conveying and rolling the cans through the heating fluid in the tank, and independent means for regulating the speed of each of the conveyers, said conveyers and runways coacting to roll the cans as they are conveyed and said conveyers extending under and along the runways in the tank, substantially as specified.

28. The combination with a tank containing a heating fluid and a plurality of tracks or runways for the cans extending into and out of the tank and having downward inclines at the entrance end thereof and upward inclines at the exit end thereof, of a plurality of independently and simultaneously movable traveling conveyers for conveying and rolling the cans through the heating fluid in the tank, and means for automatically delivering the cans or vessels to the conveyers, said conveyers and runways coacting to roll the cans as they are conveyed and said conveyers extending under and along the runways in the tank, substantially as specified.

29. The combination with a tank containing a heating fluid and a runway for the cans extending into and out of said tank, and having a downward incline at the entrance end thereof and an upward incline at the exit end thereof, of a can-conveyer for conveying and rolling the cans through the heating fluid in the tank, and means for varying or adjusting the speed of the conveyer to the time required for cooking or processing different food products, said conveyer and runway coacting to roll the cans as they are conveyed and said conveyer extending under and along the runway in the tank, substantially as specified.

30. The combination with a tank containing a heating fluid, of a track or runway for the cans or vessels extending downward into through and upward out of the tank, and means for rolling the cans or vessels along said runway, said conveyer and runway coacting to roll the cans as they are conveyed and said conveyer extending under and along the runway in the tank, substantially as specified.

31. The combination with a tank containing a heating fluid, of a track or runway for the cans or vessels extending downward into through and upward out of the tank, means for rotating the cans or vessels along said runway, and means for adjusting or regulating the speed of the cans as they are rolled through the tank, said conveyer and runway coacting to roll the cans as they are conveyed and said conveyer extending under and along the runway in the tank, substantially as specified.

SAMUEL J. DUNKLEY.

Witnesses:
H. M. MUNDAY,
WM. GEIGER.